March 30, 1948.　　　C. J. GIBBS ET AL　　　2,438,747
APPARATUS FOR REMOVING RANDOM FLUCTUATIONS
FROM INTENSITY MEASUREMENTS
Original Filed March 4, 1944
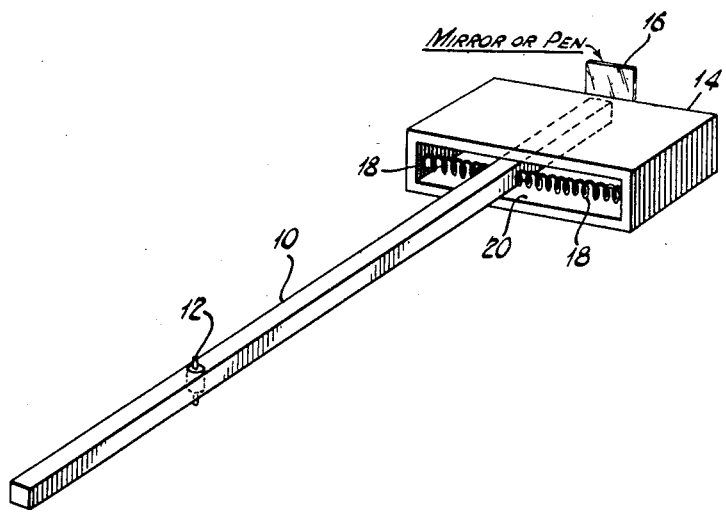
INVENTOR
C. J. GIBBS.
and JAMES H. STEIN.
BY
ATTORNEY Patented Mar. 30, 1948

2,438,747

UNITED STATES PATENT OFFICE 2,438,747

APPARATUS FOR REMOVING RANDOM FLUCTUATIONS FROM INTENSITY MEASUREMENTS

Clifford J. Gibbs, Laingsburg, Mich., and James H. Stein, Toms River, N. J., assignors to Texaco Development Corporation, New York, N. Y., a corporation of Delaware Original application March 4, 1944, Serial No. 525,050. Divided and this application September 22, 1945, Serial No. 618,040

1 Claim. (Cl. 73—430)

This invention relates to the measuring or recording, or both, of variable intensities the true values of which are marked by random fluctuations, and more particularly to an apparatus for smoothing out random or satistical fluctuations which occur, for example, in the logging of formations traversed by a bore hole or well, wherein variations in the radioactivity of the formations are measured as an indication of the nature or character of the formations. Another application of the invention is in the removing of fluctuations which occur in making an electrical log (resistance log and self-potential log) of a well, and which fluctuations are due to irregularities in the contact of the electrodes with the surrounding medium and to other accidental causes. Still another application of the same idea relates to the smoothing out of irregularities in the plate current of radio tubes. Such irregularities are due to the random nature of electron emission by the cathode of the tube.

This application is a division of our application Serial No. 525,050 filed March 4, 1944 in which is also disclosed an electrical circuit by means of which a smooth record may be obtained.

The principal object of the present invention is to provide a device for smoothing out a record so as to prevent confusion which might be caused by random fluctuations without, however, destroying the usefulness of the record by also eliminating peaks or dips in the record which are pertinent and meaningful as indications, for instance, of the presence of underground formations having different radioactivity from the adjacent formations.

It is obvious, of course, that the random fluctuations in the value of a measurement may be reduced to any desired fraction of their original amplitude by means of a suitable low-pass filter, mechanical or electrical. Also, it is true that while such a filter will transmit long-time variations in the average level, it reduces the amplitude of short-time variations to a great extent.

It is in the transmission of these short-time variations in the average level of the measurement that the simple low-pass filter is unsatisfactory, and it was a search for a filter which would respond to short-time indications which led to the present invention.

In accordance with the present embodiment of the invention a mechanical device smooths out the random or statistical fluctuations. In this form of the invention the mirror or a pen of the recording galvanometer is mounted on a block or frame which is supported on the arm or needle of the galvanometer by springs. The springs absorb small movements of the arm caused by random fluctuations but permit the block to follow movements indicating changes of the average intensity.

For a better understanding of the invention reference may be had to the accompanying drawing which is a perspective view of a mechanical device embodying the principles of the invention.

Referring to the drawing, the single figure shows a mechanical device for preventing random fluctuations from appearing in an intensity record. The arm 10 represents the indicating pointer of an instrument such as a recording galvanometer and is pivoted as is shown at 12. A frame member or hollow block 14 has affixed thereto a pen or mirror indicated diagrammatically at 16 so that movements of the frame in a direction of its longitudinal axis may be recorded either on a moving sheet of paper, not shown, or by means of a beam of light reflected from the mirror to a photosensitive surface such as a moving film. The frame 14 is supported from the two opposite sides of the arm 10 by means of resilient springs 18 so that slight movements or vibrations of the arm 10 will be absorbed by the resiliency of the springs without causing movement of the frame 14, which, because of its inertia, has resistance to movement. However, when the average intensity of the quantity to be measured increases or decreases, one of the springs will be completely compressed so that movement of the arm 10 will be transmitted positively to the frame 14 and thus to the marking or indicating device 16 so that these movements of the arm due to actual variations in the quantity to be measured will be recorded. With the marking device resiliently attached to the arm 10, as by means of the springs 18, random fluctuations will be eliminated or materially smoothed out so that an intelligible record will result. The amplitude of the fluctuations which are to be suppressed can be controlled by changing the width of the slot 20 in the frame or block 14 or by moving the block along the arm 10. If desired, artificial damping of the system can be accomplished by conventional means such as a dashpot, but this is not essential.

The essential feature in this invention is the fact that its suppression of short-time fluctuations, random or otherwise, occurs only when those fluctuations are less than a definite, predetermined magnitude as fixed by the extent of the motion which the arm 10 may make without striking the frame 14. Said motion is made only large enough to accommodate the amplitude of the fluctuations which are to be suppressed; any fluctuation of greater amplitude than this, regardless of how short is its duration, will be recorded, whereas, with a simple "shock-absorber" arrangement in which the arm 10 were never allowed to strike the frame 14, the same short-time fluctuation would be appreciably suppressed. If the desired fluctuation were of a sufficiently short duration, it is possible that it would be completely lost in the smoothing action of the simple shock-absorber, or low-pass filter, while with the device embodying this invention the fact that the excursion is of short duration is of no consequence provided only that its amplitude exceeds the predetermined critical amplitude at which the arm strikes the frame and imparts to the latter a positive motion.

Although the invention is described in connection with the measuring or recording of natural radioactivity, it is to be understood that it is also applicable in measuring other forms of radioactivity such as scattered neutrons and gamma rays, as well as in the measuring or recording of other quantities—in fact, whenever a continuous indication of intensity measurements generally is desired.

Obviously many modifications and variations of the invention, as hereinbefore set forth, may be made without departing from the spirit and scope thereof, but only such limitations should be imposed as are indicated in the appended claim.

We claim:

An instrument for indicating continuous variations in a quantity, said instrument having a pointer arm movable in response to said variations and also in response to random fluctuations, means for smoothing out said random fluctuations comprising an inertia member provided with a slot in the plane of movement of the pointer arm, an indicating device on said inertia member, the outer end portion of said pointer arm projecting into said slot, and compression springs between opposite sides of said end portion of the pointer arm and the walls of the inertia member at the ends of the slot, said springs serving to absorb movements of said pointer arm caused by said random fluctuations and to transmit to said inertia member and indicating device movements of the pointer arm caused by average variations in said quantity.

CLIFFORD J. GIBBS.
JAMES H. STEIN.

REFERENCES CITED

The following references are of record in the file of this patent:

UNITED STATES PATENTS

| Number | Name | Date |
|---|---|---|
| 1,833,233 | Sieber | Nov. 24, 1931 |
| 2,007,129 | Lynch | July 2, 1935 |
| 2,058,431 | Eschenbacher | Oct. 27, 1936 |
| 2,302,670 | Buchanan | Nov. 24, 1942 |
| 2,325,326 | Kiene | July 27, 1943 |